United States Patent
Lin

(10) Patent No.: US 9,323,018 B2
(45) Date of Patent: Apr. 26, 2016

(54) HDMI SIGNALS TRANSMISSION DEVICE

(71) Applicant: HON HAI PRECISION INDUSTRY CO., LTD., New Taipei (TW)

(72) Inventor: I-Thun Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 201 days.

(21) Appl. No.: 14/014,303

(22) Filed: Aug. 29, 2013

(65) Prior Publication Data
US 2014/0341514 A1    Nov. 20, 2014

(30) Foreign Application Priority Data
May 20, 2013   (TW) .................................. 102117698

(51) Int. Cl.
  *G02B 6/43*   (2006.01)
  *G02B 6/42*   (2006.01)
  *H01R 31/06*  (2006.01)

(52) U.S. Cl.
  CPC ............ *G02B 6/43* (2013.01); *G02B 6/4284* (2013.01); *G02B 6/4214* (2013.01); *G02B 6/4292* (2013.01); *H01R 31/065* (2013.01)

(58) Field of Classification Search
  None
  See application file for complete search history.

(56) References Cited

U.S. PATENT DOCUMENTS

| | | | | |
|---|---|---|---|---|
| 3,809,908 A | * | 5/1974 | Clanton | G02B 6/4295 174/359 |
| 6,912,361 B2 | * | 6/2005 | Aronson | H04B 10/50 398/135 |
| 7,394,989 B2 | * | 7/2008 | Ozeki | H04B 10/077 398/13 |
| 7,924,861 B2 | * | 4/2011 | Baba | G09G 5/006 370/419 |
| 8,452,181 B2 | * | 5/2013 | Yasuda | G02B 6/4416 385/101 |
| 8,935,740 B2 | * | 1/2015 | Suzuki | H04B 10/12 725/149 |
| 8,979,394 B2 | * | 3/2015 | Ertel | G02B 6/4204 385/93 |
| 2006/0227836 A1 | * | 10/2006 | Omori | H01S 5/423 372/50.124 |
| 2007/0014522 A1 | * | 1/2007 | Yamaguchi | G02B 6/3817 385/88 |
| 2014/0178015 A1 | * | 6/2014 | Tong | G02B 6/4293 385/88 |

* cited by examiner

*Primary Examiner* — John M Bedtelyon
(74) *Attorney, Agent, or Firm* — Novak Druce Connolly Bove + Quigg LLP

(57) ABSTRACT

An HDMI signals transmission device includes a first HDMI connector, a second HDMI connector, a first cable, a second cable, and an optical fiber connector assembly. One end of the first cable is electrically connected to the first HDMI connector. One end of the second cable is electrically connected to the second HDMI connector. The optical fiber connector assembly includes a first optical fiber connector electrically connected to the other end of the first cable, a second optical fiber connector electrically connected to the other end of the second cable, a first optical fiber interconnected between the first optical fiber connector and the second optical fiber connector, and a second optical fiber interconnected between the first optical fiber connector and the second optical fiber connector.

7 Claims, 5 Drawing Sheets

US 9,323,018 B2

HDMI SIGNALS TRANSMISSION DEVICE

BACKGROUND

1. Technical Field

The present disclosure relates to signals transmission technologies, and particularly to a High-Definition Multimedia Interface (HDMI) signals transmission device.

2. Description of Related Art

HDMI is a compact audio/video interface for transferring uncompressed video signals and compressed/uncompressed digital audio signals from an HDMI-compliant device (the source device) to a compatible computer monitor, video projector, digital television, or digital audio device. An HDMI signals transmission device is an HDMI-standard cable connector, which is used in any uncompressed TV or PC video format to transfer the video signals and audio signals. The HDMI signals transmission device includes a cable made of copper, and two connectors connected to opposite ends of the cable. In order to save on costs, the cable is designed to be short, as copper is very expensive. However, the HDMI signals transmission device can not be used for remote transmission of HDMI signals.

Therefore, it is desirable to provide an HDMI signals transmission device, which can overcome or alleviate the above-mentioned problems.

DETAILED DESCRIPTION

Figure 1:
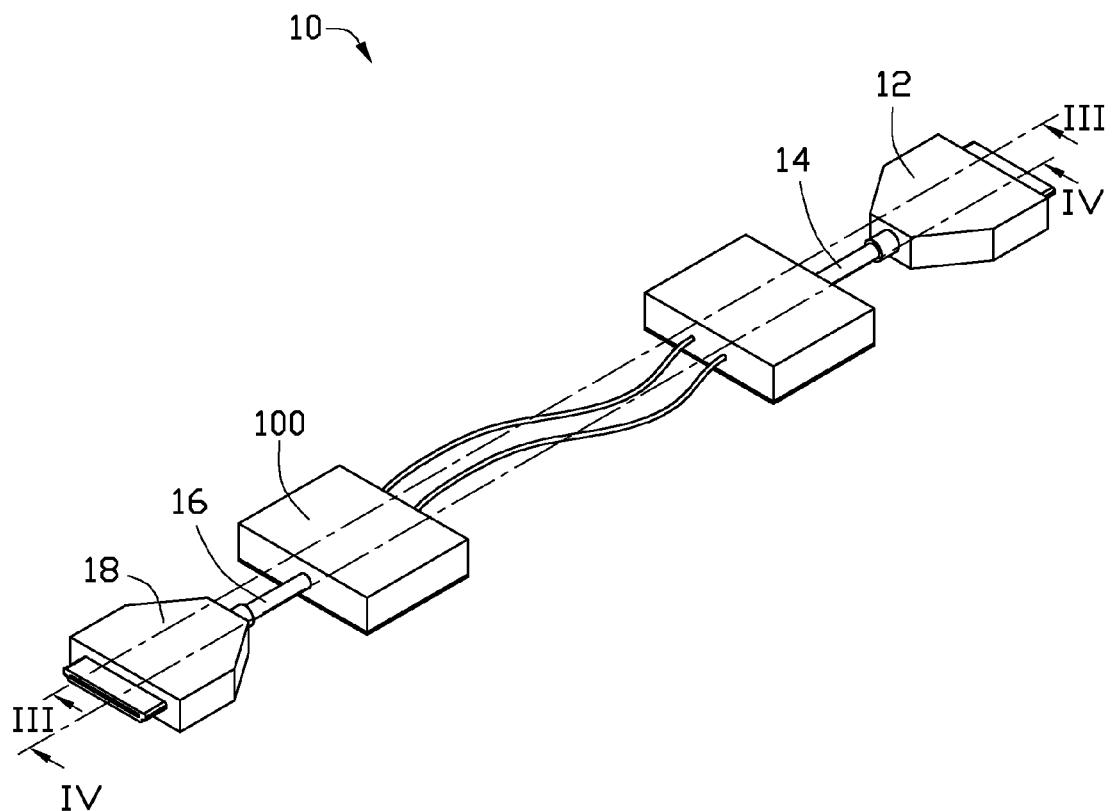
FIG. 1 is a schematic, isometric view of an HDMI signals transmission device, according to an exemplary embodiment.

FIG. 1 shows an HDMI signals transmission device 10 according to an exemplary embodiment. The HDMI signals transmission device 10 includes a first HDMI connector 12, a first cable 14, an optical fiber connector assembly 100, a second cable 16, and a second HDMI connector 18. One end of the first cable 14 is connected to the first HDMI connector 12, one end of the second cable 16 is connected to the second HDMI connector 18, and the other end of the first cable 14 is connected to the other end of the second cable 16 through the optical fiber connector assembly 100. In this embodiment, the first cable 14 and the second cable 16 are both made of copper.

Figure 2:
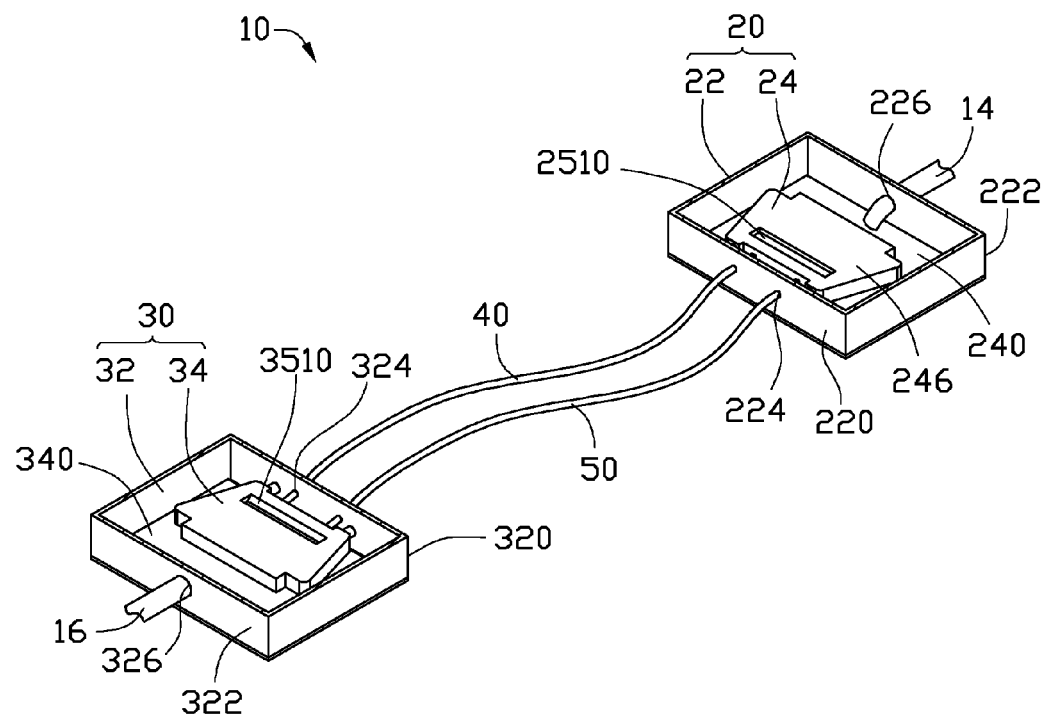
FIG. 2 is a cut-away view of the HDMI signals transmission device of FIG. 1.

FIG. 2 shows that the optical fiber connector assembly 100 includes a first optical fiber connector 20, a second optical fiber connector 30, a first optical fiber 40, and a second optical fiber 50. The first optical fiber connector 20 is connected to the first cable 14. One end of the first optical fiber 40 is connected to the first optical fiber connector 20, and the other end of the first optical fiber 40 is connected to the second optical fiber connector 30. One end of the second optical fiber 50 is connected to the first optical fiber connector 20, and the other end of the second optical fiber 50 is connected to the second optical fiber connector 30. The second optical fiber connector 30 is connected to the second cable 16.

Figure 3:
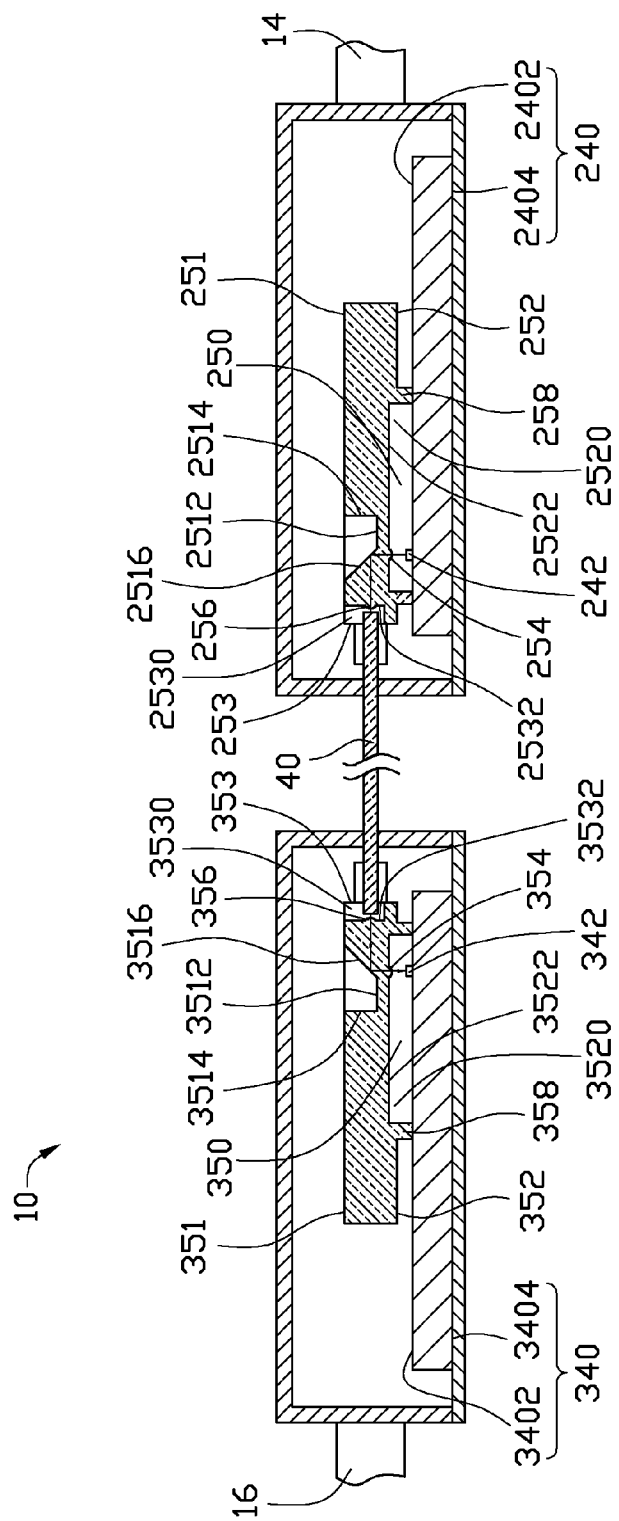
FIG. 3 is a cross-sectional view of the HDMI signals transmission device of FIG. 1, taken along the line III-III of FIG. 1.
Figure 4:
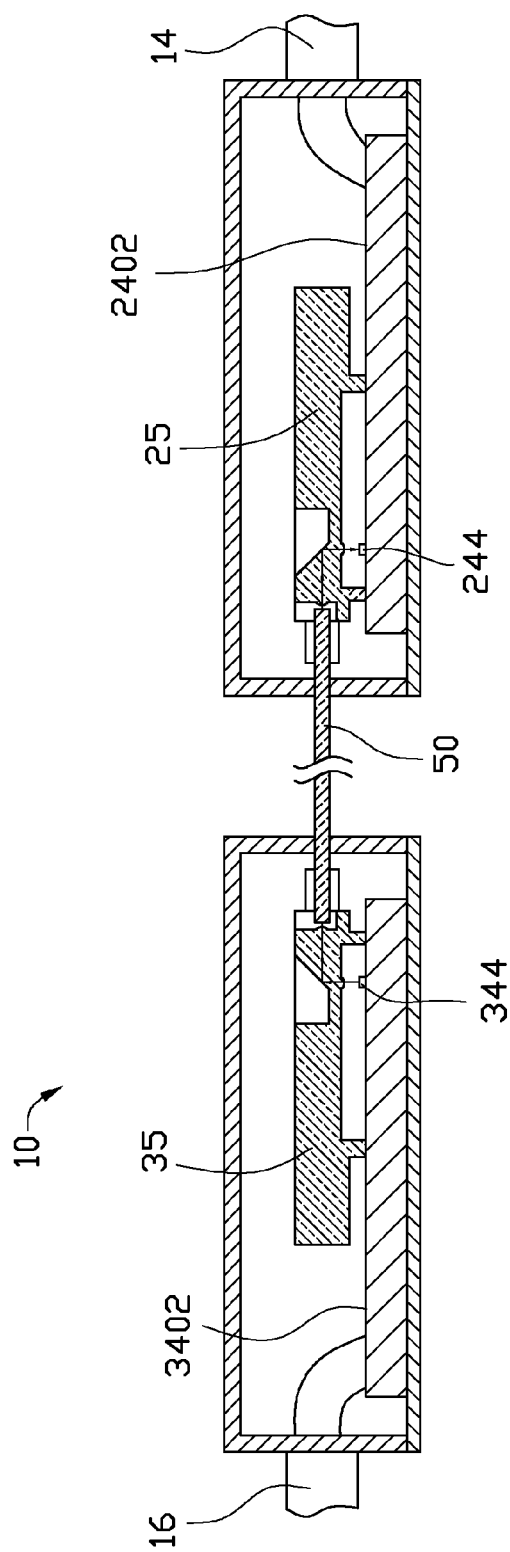
FIG. 4 is a cross-sectional view of the HDMI signals transmission device of FIG. 1, taken along the line IV-IV of FIG. 1.

FIGS. 2-4 show that the first optical fiber connector 20 includes a first main body 22, and a first photoelectric conversion module 24 received in the first main body 22.

The first main body 22 is substantially a hollow cube. The first main body 22 includes a first front wall 220, and a first rear wall 222. The first front wall 220 and the first rear wall 222 are poisoned at opposite sides of the first main body 22, and the first front wall 220 is substantially parallel to the first rear wall 222. The first front wall 220 defines two first passing holes 224. The first rear wall 222 defines a first through holes 226.

The first photoelectric conversion module 24 includes a first circuit board 240, a first light-emitting unit 242, a first light-receiving unit 244, and a first optical coupling unit 25.

The first circuit board 240 is positioned on a bottom of the first main body 22 and includes a first upper surface 2402 and a first lower surface 2404. The first upper surface 2402 and the first lower surface 2404 are positioned at opposite sides of the first circuit board 240, and the first upper surface 2402 is substantially parallel to the first lower surface 2404. The first cable 14 passes through the first through hole 226 and is connected to the first upper surface 2402. Thus, the first cable 14 is electrically connected to the first circuit board 240.

The first light-emitting unit 242 and the first light-receiving unit 244 are mounted on the first upper surface 2402 and are spaced from each other. The first light-emitting unit 242 and the first light-receiving unit 244 are electrically connected to the first circuit board 240.

The first optical coupling unit 25 includes a first top surface 251, a first bottom surface 252, a first front surface 253, two first converging lenses 254, two second converging lenses 256, and a first support 258.

The first top surface 251 and the first bottom surface 252 are positioned at opposite sides of the first optical coupling unit 25, and the first top surface 251 is substantially parallel to the first bottom surface 252. The first front surface 253 is perpendicularly interconnected between the first top surface 251 and the first bottom surface 252.

The first top surface 251 defines a first top recess 2510. The first optical coupling unit 25 further includes a first surface 2512, a second surface 2514, and a first reflection surface 2516 in the first top recess 2510. The first surface 2512 is positioned at a bottom of the first top recess 2510, and is substantially parallel to the first top surface 251. The second surface 2514 is positioned at one side of the first top recess 2510, and is perpendicularly interconnected between the first surface 2512 and the first top surface 251. The first reflection surface 2516 is positioned at opposite ends of the first top recess 2510, and is obliquely interconnected between the first surface 2512 and the first top surface 251.

The first bottom surface 252 defines a rectangular first bottom recess 2520. The first optical coupling unit 25 further includes a first optical surface 2522 at a bottom of the first bottom recess 2520. The first optical surface 2522 is substantially parallel to the first bottom surface 252.

The first front surface 253 defines a first cutout 2530. The first optical coupling unit 25 further includes a second optical surface 2532 in the first cutout 2530. The second optical surface 2532 is substantially parallel to the first front surface 253. That is, the second optical surface 2532 is substantially perpendicular to the first optical surface 2522, the first top surface 251, and the first bottom surface 252. In this embodiment, an included angle between a main plane of the first optical surface 2522 and a main plane of the first reflection surface 2516 is about 45 degrees, and an included angle between a main plane of the second optical surface 2532 and a main plane of the second reflection surface 2516 is about 45 degrees.

The first converging lenses 254 are formed on the first optical surface 2522 and are aligned with the first light-emitting unit 242 and the first light-receiving unit 244, respectively. In this embodiment, each of the first converging lenses 254 is a convex lens.

The second converging lenses 256 are formed on the second optical surface 2532 and correspond to the first converging lenses 254. In this embodiment, each of the second converging lenses 256 is a convex lens.

The first support 258 is a substantially rectangular frame and extends from the first bottom surface 252. The first support 258 surrounds the first bottom recess 2520. In this embodiment, the first support 258 is adhered to the first upper surface 2402 by an adhesive agent to form a first cavity 250 between the first optical surface 2522 and the first upper surface 2402. The first light-emitting unit 242 and the first light-receiving unit 244 are received in the first cavity 250.

FIGS. 2-4 also show that the second optical fiber connector 30 includes a second main body 32, and a second photoelectric conversion module 34 received in the second main body 32.

The second main body 32 is substantially a hollow cube. The second main body 32 includes a second front wall 320, and a second rear wall 322. The second front wall 320 and the second rear wall 322 are poisoned at opposite sides of the second main body 32, and the second front wall 320 is substantially parallel to the second rear wall 322. The second front wall 320 defines two second passing holes 324. The second rear wall 322 defines a second through holes 326.

The second photoelectric conversion module 34 includes a second circuit board 340, a second light-receiving unit 342, a second light-emitting unit 344, and a second optical coupling unit 35.

The second circuit board 340 is positioned on a bottom of the second main body 32 and includes a second upper surface 3402 and a second lower surface 3404. The second upper surface 3402 and the second lower surface 3404 are positioned at opposite sides of the second circuit board 340, and the second upper surface 3402 is substantially parallel to the second lower surface 3404. The second cable 16 passes through the second through hole 326 and is connected to the second upper surface 3402. Thus, the second cable 16 is electrically connected to the second circuit board 340.

The second light-receiving unit 342 and the second light-emitting unit 344 are mounted on the second upper surface 3402 and are spaced from each other. The second light-receiving unit 342 and the second light-emitting unit 344 are electrically connected to the second circuit board 340.

The second optical coupling unit 35 includes a second top surface 351, a second bottom surface 352, a second front surface 353, two third converging lenses 354, two fourth converging lenses 356, and a second support 358.

The second top surface 351 and the second bottom surface 352 are positioned at opposite sides of the second optical coupling unit 35, and the second top surface 351 is substantially parallel to the second bottom surface 352. The second front surface 353 is perpendicularly interconnected between the second top surface 351 and the second bottom surface 352.

The second top surface 351 defines a second top recess 3510. The second optical coupling unit 35 further includes a third surface 3512, a fourth surface 3514, and a second reflection surface 3516 in the second top recess 3510. The third surface 3512 is positioned at a bottom of the second top recess 3510, and is substantially parallel to the second top surface 351. The fourth surface 3514 is positioned at one side of the second top recess 3510, and is perpendicularly interconnected between the third surface 3512 and the second top surface 351. The second reflection surface 3516 is positioned at opposite ends of the second top recess 3510, and is obliquely interconnected between the third surface 3512 and the second top surface 351.

The second bottom surface 352 defines a substantially rectangular second bottom recess 3520. The second optical coupling unit 35 further includes a third optical surface 3522 at a bottom of the second bottom recess 3520. The third optical surface 3522 is substantially parallel to the second bottom surface 352.

The second front surface 353 defines a second cutout 3530. The second optical coupling unit 35 further includes a fourth optical surface 3532 in the second cutout 3530. The fourth optical surface 3532 is substantially parallel to the second front surface 353. That is, the fourth optical surface 3532 is substantially perpendicular to the third optical surface 3522, the second top surface 351, and the second bottom surface 352. In this embodiment, an included angle between a main plane of the third optical surface 3522 and a main plane of the second reflection surface 3516 is about 45 degrees, and an included angle between a main plane of the fourth optical surface 3532 and a main plane of the second reflection surface 3516 is about 45 degrees.

The third converging lenses 354 are formed on the third optical surface 3522 and are aligned with the second light-receiving unit 342 and the second light-emitting unit 344, respectively. In this embodiment, each of the third converging lenses 354 is a convex lens.

The fourth converging lenses 356 are formed on the fourth optical surface 3532 and correspond to the third converging lenses 354. In this embodiment, each of the fourth converging lenses 356 is a convex lens.

The second support 358 is a substantially rectangular frame and extends from the second bottom surface 352. The second support 358 surrounds the second bottom recess 3520. In this embodiment, the second support 358 is adhered to the second upper surface 3402 by an adhesive agent to form a second cavity 350 between the third optical surface 3522 and the second upper surface 3402. The second light-receiving unit 342 and the second light-emitting unit 344 are received in the second cavity 350.

In this embodiment, the first light-emitting unit 242 and the second light-emitting unit 244 are both vertical cavity surface emitting laser (VCSEL) diodes, and are configured for emitting light. The first light-receiving unit 342 and the second light-emitting unit 344 are both photo diodes and are configured for receiving light.

One end of the first optical fiber 40 passes through one of the two first passing holes 224 and is aligned with one of the two second converging lenses 256, while the other end of the first optical fiber 40 passes through one of the two second passing holes 324 and is aligned with one of the two fourth converging lenses 356.

One end of the second optical fiber 50 passes through the other one of the two first passing holes 224 and is aligned with the other one of the two second converging lenses 256, while the other end of the second optical fiber 50 passes through the other one of the two second passing holes 324 and is aligned with the other one of the two fourth converging lenses 356.

Figure 5:
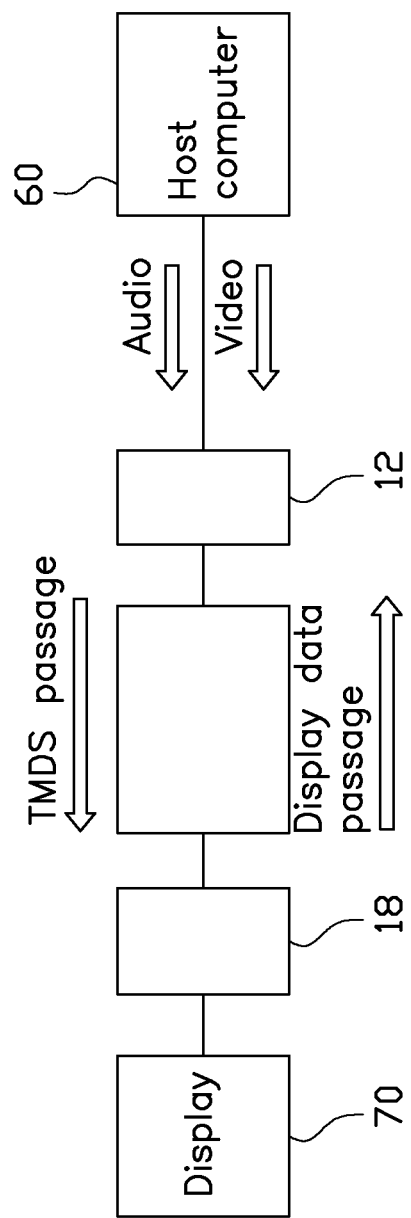
FIG. 5 is a schematic view of signals transmission of the HDMI signals transmission device of FIG. 1.

Referring to FIGS. 3-5, when the HDMI signals transmission device 10 is used for connecting a host computer 60 and a display 70, the first HDMI connector 12 is plugged into the host computer 60, and the second HDMI connector 18 is plugged into the display 70. A first electric signal from the display 70 is transmitted to the second circuit board 340 through the second cable 16. The first electric signal is an extended display identification data (EDID) of the display 70, which includes a resolution and video data of the display 70. The second light-emitting unit 344 converts the first electric signal to a first optical signal. The first optical signal passes through the third converging lens 354, the second reflection surface 3516, the fourth converging lens 356, the second optical fiber 50, the second converging lens 256, the first reflection surface 2516, and the first converging lens 254, and is received by the first light-receiving unit 244. The first light-receiving unit 244 converts the first optical signal to the first electric signal, and the first electric signal is transmitted to the host computer 60 through the first cable 14. In this situation, the second optical fiber 50 functions as a display data passage.

When the host computer 60 reads the EDID of the display 70, a second electric signal from the host computer 60 is transmitted to the first circuit board 240 through the first cable 14. The second electric signal is a high speed differential signal which transmits video data and audio data. The first-emitting unit 242 converts the second electric signal to a second optical signal. The second optical signal passes through the first converging lens 254, the first reflection surface 2516, the second converging lens 256, the first optical fiber 40, the fourth converging lens 356, the second reflection surface 3516, and the third converging lens 354, and is received by the second light-receiving unit 342. The second light-receiving unit 342 converts the second optical signal to the second electric signal, and the second electric signal is transmitted to the display 70 through the second cable 16. In this embodiment, the first optical fiber 40 functions as a transition-minimized differential signaling (TMDS) passage.

The HDMI signals transmission device 10 is used for connecting a host computer 60 to a display 70. Remote transmission of HDMI signals between the host computer 60 and the display 70 is achieved because the first optical fiber 40 and the second optical fiber 50 extend the length of the HDMI signals transmission device 10, so that the length of the first cable 14 and the second cable 16 is shortened.

Even though numerous characteristics and advantages of the present embodiments have been set forth in the foregoing description, together with details of the structures and functions of the embodiments, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. An HDMI signals transmission device comprising:
a first HDMI connector;
a second HDMI connector;
a first cable, one end of the first cable electrically connected to the first HDMI connector;
a second cable, one end of the second cable electrically connected to the second HDMI connector; and
an optical fiber connector assembly comprising a first optical fiber connector electrically connected to the other end of the first cable, a second optical fiber connector electrically connected to the other end of the second cable, a first optical fiber interconnected between the first optical fiber connector and the second optical fiber connector, and a second optical fiber interconnected between the first optical fiber connector and the second optical fiber connector;

wherein the second optical fiber connector is configured to convert a first electric signal through the second cable to a first optical signal, the second optical fiber is configured to transmit the first optical signal to the first optical fiber connector, the first optical fiber connector is configured to convert the first optical signal to the first electric signal and convert a second electric signal through the first cable to a second optical signal, the first optical fiber is configured to transmit the second optical signal to the second optical fiber connector, the second optical fiber connector configured to convert the second optical signal to the second electric signal, the first optical fiber connector comprises a first main body and a first photoelectric conversion module received in the first main body, the first photoelectric conversion module comprises a first circuit board, a first light-emitting unit, a first light-receiving unit, and a first optical coupling unit, the first light-emitting unit and the first light-receiving unit are mounted on the first circuit board, the first optical coupling unit is positioned above the first light-emitting unit and the first light-receiving unit, the second optical fiber connector comprises a second main body and a second photoelectric conversion module received in the second main body, the second photoelectric conversion module comprises a second circuit board, a second light-emitting unit, a second light-receiving unit, and a second optical coupling unit, the second light-emitting unit and the second light-receiving unit are mounted on the second circuit board, the second optical coupling unit is positioned above the second light-emitting unit and the second light-receiving unit, opposite ends of the first optical fiber are inserted into the first main body and the second main body and correspond to the first light-emitting unit and the second light-receiving unit, opposite ends of the second optical fiber are inserted into the first main body and the second main body and correspond to the first light-receiving unit and the second light-emitting unit, the first light-emitting unit is configured to convert the second electric signal to the second optical signal, the second light-emitting unit is configured to convert the first electric signal to the first optical signal, the first light-receiving unit is configured to convert the first optical signal to the first electric signal, and the second light-receiving unit is configured to convert the second optical signal to the second electric signal, the first optical coupling unit comprises a first optical surface, a second optical surface perpendicular to the first optical surface, and a first reflection surface oblique relative to the first and second optical surfaces, two first converging lenses are formed on the first optical surface, and two second converging lenses are formed on the second optical surface corresponding to the first converging lenses, the first optical coupling unit is mounted on the first circuit board, and the first converging lenses are aligned with the first light-emitting unit and the first light-receiving unit, the first optical coupling unit further comprises a first top surface, a first bottom surface opposite to the first top surface, and a first front surface perpendicular interconnected between the first top surface and the first bottom surface, the first top surface defines a first top recess, the first bottom surface defines a first bottom recess, the first front surface defines a first cutout, the first optical coupling unit further comprises a first surface parallel to the first top surface, a second surface perpendicularly interconnected between the first top surface and the first surface, and the first reflection surface is obliquely interconnected between the first top surface and the first surface, the first optical surface in the first bottom recess and the second optical surface in the first cutout, and the first surface, the second surface, and the first reflection surface are positioned in the first top recess.

2. The HDMI signals transmission device of claim 1, wherein the first electric signal includes extended display identification data, and the second electric signal is a high speed differential signal for transmitting video data and audio data.

3. The HDMI signals transmission device of claim 1, wherein the first optical coupling unit further comprises a first support extending from the first bottom surface, the first support surrounds the first bottom recess, the first support is supported on the first circuit board to form a first cavity between the first optical surface and the first circuit board, and the first light-emitting unit and the first light-receiving unit are received in the first cavity.

4. The HDMI signals transmission device of claim 3, wherein the second optical coupling unit comprises a third optical surface, a fourth optical surface perpendicular to the third optical surface, and a second reflection surface oblique relative to the third and fourth optical surfaces, two third converging lenses formed on the third optical surface, and two fourth converging lenses formed on the fourth optical surface corresponding to the second converging lenses, the second optical coupling unit is mounted on the second circuit board, and the third converging lenses are aligned with the second light-emitting unit and the second light-receiving unit.

5. The HDMI signals transmission device of claim 4, wherein the second optical coupling unit further comprises a second top surface, a second bottom surface opposite to the second top surface, and a second front surface perpendicular interconnected between the second top surface and the second bottom surface, the second top surface defines a second top recess, the second bottom surface defines a second bottom recess, the second front surface defines a second cutout, the second optical coupling unit further comprises a third surface parallel to the second top surface, a fourth surface perpendicularly interconnected between the second top surface and the third surface, and the second reflection surface obliquely interconnected between the second top surface and the third surface, the third optical surface in the second bottom recess, and the fourth optical surface in the second cutout, and the third surface, the fourth surface, and the second reflection surface are positioned in the second top recess.

6. The HDMI signals transmission device of claim 5, wherein the second optical coupling unit further comprises a second support extending from the second bottom surface, the second support surrounds the second bottom recess, the second support is supported on the second circuit board to from a second cavity between the third optical surface and the second circuit board, and the second light-emitting unit and the second light-receiving unit are received in the second cavity.

7. The HDMI signals transmission device of claim 6, wherein an included angle between a main plane of the first optical surface and a main plane of the first reflection surface is about 45 degrees, and an included angle between a main plane of the second optical surface and a main plane of the second reflection surface.

* * * * *